Feb. 18, 1958        C. R. WORBY        2,824,034
METHOD OF IMPREGNATING A FABRIC WITH POLYETHYLENE
Filed Sept. 13, 1955
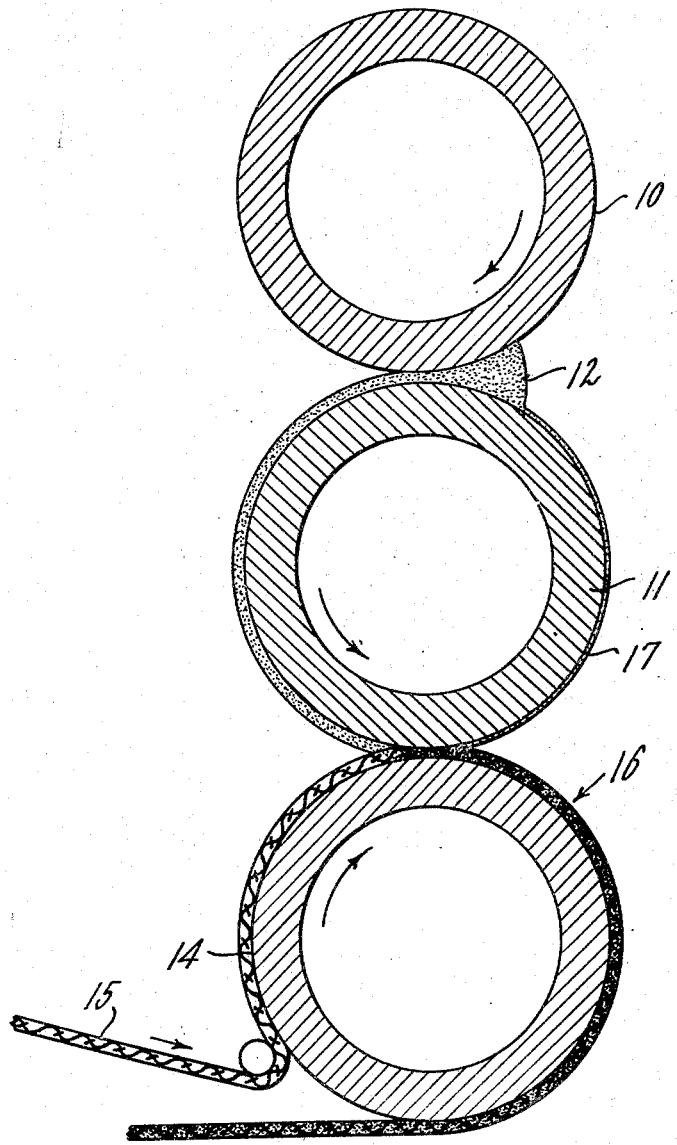
INVENTOR.
CHARLES R. WORBY

2,824,034

METHOD OF IMPREGNATING A FABRIC WITH POLYETHYLENE

Charles R. Worby, Eau Claire, Wis., assignor to United States Rubber Company, New York, N. Y., a corporation of New Jersey Application September 13, 1955, Serial No. 533,975

4 Claims. (Cl. 154—102)

This invention relates to a method of impregnating a fabric with an impregnant consisting essentially of polyethylene, and to the product produced by this method.

Polyethylene in continuous, i. e. sheet, form is in great demand in the rubber industry as a protecting surface covering for raw tacky rubber articles to prevent these raw rubber articles from adhering together before they are vulcanized. For example, unsupported polyethylene film is commonly used as a protective surface for camelback to prevent the several convolutions in a roll of camelback from adhering to each other. Similarly, polyethylene coated fabrics have been used as liners by rubber manufacturers to prevent sheets containing raw rubber from adhering together when rolled into rolls for storage or preparatory to use of these sheets.

As is well known, unsupported films of polyethylene do not have great strength, and although such films may be useful for lining such articles as camelback, where the film is not subjected normally to rough handling, they are not very satisfactory for applications such as liners for coated tire fabric, where they will be subjected to rough handling in use and where it is desirable that the liner be capable of repeated re-use. Supported films of polyethylene, e. g. loosely woven fabrics coated with polyethylene, have been used for liners of this sort with some success. However, these latter products are not as satisfactory as might be desired particularly because of the difficulty of obtaining satisfactory adhesion between the film of polyethylene and the surface of the supporting fabric even when the weave is very loose and open. The strength of this bond is important where the polyethylene is to come in contact repeatedly with tacky raw rubber compounds. As these compounds are stripped away from the polyethylene coated fabric they tend to separate the polyethylene from the fabric, and with repeated re-use the bond soon fails so that the polyethylene coated fabric is unsuitable for further use.

It has been proposed also to "impregnate" fabrics with polyethylene, as by passing a fabric through baths of solutions or suspensions of polyethylene. The resulting product is not impregnated in the sense that the method of this invention impregnates a fabric with polyethylene, and in the sense in which the term impregnate is used throughout this specification and the appended claims. By this prior proposed method, the polyethylene is applied only as a surface coating to the exposed surfaces in the fabric by absorption from the solution or suspension.

According to this invention a fabric is impregnated with polyethylene by completely filling all the interstices in the fabric. The improvement in penetration of the fabric achieved using the process of this invention becomes particularly great when the material being coated is a woven fabric of tight weave such as enameling ducks. The prior solution or suspension technique does not fill the voids of such fabrics but rather deposits merely a surface coating on the fabrics and for that reason the product is prone to failure at the bond between the surface coating and the fabric.

Furthermore, because of the nature of polyethylene, it is extremely difficult to apply a film of this material to a fabric by normal coating techniques. In order to apply such a film to a fabric, as by the customary calendering techniques, it is essential to heat the polyethylene until it becomes soft. As is well known this material melts sharply at 239° F. However above its melting temperature, the polyethylene becomes extremely tacky and sticks to the calender rolls so that it cannot be calendered satisfactorily onto a fabric. I believe that for this reason heretofore it has not been possible to calender coat satisfactorily a fabric with a material consisting essentially of polyethylene because of this adherence of the polyethylene to the calender rolls. To overcome this tackiness of the polyethylene, it has been proposed to add a small proportion of a lubricant, such as a plasticizer, to the polyethylene on the calender to facilitate separation of the material from the calender rolls. However fabrics which are coated with polyethylene containing such a lubricant generally would not be suitable for liners for rubber articles because of the undesirable effect the lubricant is likely to produce in the raw rubber compounds rolled up in the liner.

This invention contemplates a novel method of producing a fabric impregnated with an impregnant consisting essentially of polyethylene on a calender and more particularly to a novel method of so impregnating liner fabrics. In accordance with this invention, a sheet of polyethylene is formed on a roll heated to a temperature at least 250° F., as by sheeting the polyethylene on a well known three roll calender in which the top roll is heated to a temperature below 250° F. and the middle roll is heated to a temperature at least 250° F. This film of polyethylene then passes between a nip formed by the heated roll and a further roll. A fabric to be coated is passed through this nip with the film of polyethylene, when the nip of the rolls is set tight on the fabric so there is clearance only for the fabric and sufficient hot polyethylene to fill the fabric. The rolls are adjusted to produce a frictioning motion, so that the heated roll drives the polyethylene into all the interstices of the fabric as it passes through the nip. The friction motion shears the hot polyethylene from the calender roll and drives, or forces it into the interstices of the fabric. The resulting product has the interstices of the fabric completely filled with pure polyethylene, but there is no lamination or thickness of polyethylene on the surface of the fabric. Preferably the bottom roll of the calender is heated to a temperature below 250° F. to set up the polyethylene as it is deposited in the interstices of the fabric.

In practicing the method of this invention, the pure polyethylene sticks to the heated center roll. However this does not impair the operation of the method, because the friction action shears off sufficient polyethylene to fill the interstices of the fabrics. Any excess that clings to the heated roll merely passes around the roll to re-enter the film of polyethylene on the roll from which the polyethylene is being driven into the fabric.

It is of the essence of this invention that a material consisting essentially of polyethylene is driven into the web to be impregnated from a roll heated to a temperature at least 250° F. by a friction motion at a nip at which there is clearances only for the fabric and sufficient hot polyethylene to fill the fabric. The product produced by this method is characterized by a web impregnated with an impregnant consisting essentially of polyethylene and in which there is no lamination or thickness of polyethylene on the surface of the web. The process will have special utility when used to impregnate tightly woven fabrics, such as those having characteristics similar to enameling ducks weighing between 4 and 16 oz./sq. yd.

The polyethylene used may be polyethylene in powder form or in other readily available forms. In accordance with one specific embodiment of this invention, scrap polyethylene film was used. This polyethylene was worked on a heated mill until it became a soft homogeneous mass. The mill was preheated with steam to yield a roll surface temperature of about 220° F. The polyethylene was then loaded onto the mill. The milling was begun with the mill nip set at the minimum spacing of .125 inches. When the material is warmed sufficiently, it will come together to form a sheet. As more material was added, the mill was opened to yield a sheet of the desired thickness. The polyethylene was milled on the heated mill until a plastic sheet formed, typically for 20 to 30 minutes, and a sheet of ¼–⅜" in thickness was formed. It is found that it sometimes desirable to cool the back roll of the mill with water to keep the stock running on the front roll. After the stock has been milled, it was rolled into pigs suitable for use on a calender.

Meanwhile, a three roll calender was prepared by setting it for a friction motion with a ratio of 1.47 to 1, and by preheating the rolls with steam. The middle roll of the mill was heated to 250° F. and the top roll of the mill was heated to 220° F., this latter temperature being lower than that of the middle roll to prevent the hot polyethylene from sticking to the top roll. The bottom roll was heated to about 210° F. to set up the polyethylene deposited in the fabric as heretofore described, and to overcome any tendency of the polyethylene which might strike through the fabric from adhering to the bottom roll.

The hot milled polyethylene was fed into the nip of the top and center roll of the calender, and the fabric was processed through the nip of the center and bottom rolls with a small rolling bank of stock and with the rolls set as tightly as possible on the fabric without cutting it. For a regular carded American cotton single filled enameling duck liner weighing 8.6 ounces per square yard formed of 84 warp yarns and 28 weft yarns per inch, having a minimum warp and weft tensile strength of 135 and 75 pounds respectively, and in which the fabric was .024 inch thick, the setting of this nip was .025 inch. In the finished fabric, the polyethylene filled the interstices of the fabric, and struck through the fabric to cause a flecked appearance on the other side. The fabric after coating weighed 10.6 ounces per square yard, indicating that two ounces of polyethylene were applied to each square yard of the fabric.

Referring now to the drawing, there is shown in the single figure thereof a cross-sectional schematic view through a three roll calender illustrating the method of this invention.

As there shown, the stock is introduced to the nip formed by a top calender roll 10 and a center calender roll 11 to form a bank 12 at this nip. The polyethylene as it leaves the nip is formed into a sheet 13 on the heated calender roll 11 and is carried by this calender roll to a second nip formed by the center roll 11 and the bottom roll 14. The rotational speed of the rolls 11 and 14 are set for a frictioning motion with the roll 11 rotating at a greater speed than the roll 14. The nip formed by the center roll 11 and the bottom roll 14 is set as tight on the fabric as is possible without cutting the fabric. The hot polyethylene in the film 13 passes through the nip formed by the center roll 11 and the lower roll 14 together with a web of fabric 15. As illustrated in the drawing, the fabric preferably is run against the bottom roll some distance prior to entering the frictioning nip. This technique warms the fabric and thereby improves the penetration. This technique also makes it possible to friction soiled or used fabrics.

Also, as illustrated by the showing of the web 15 leaving the nip in the area 16, the hot polyethylene from the film 13 has been driven into the web 15, as indicated by the stippling, but no surface film has been applied to the web. As indicated at 17, excess polyethylene may cling to the back of the center roll 11 as a fairly smooth sheet, and if so it passes upwardly into the bank 12 to be reformed into the film on the center roll 11.

The method of this invention is found to have peculiar utility when it is used to impregnate a fabric suitable for use as a liner for rubber coated tire cord fabric and the like. Such fabrics desirably are closely woven of strong yarns to provide a fabric of great strength. These closely woven liner fabrics normally will have very small interstices, and for that reason it is difficult to obtain satisfactory lamination of a film to such fabrics because it is difficult to apply any more than a surface film that is adhered merely to the upper fibers of the fabric. So far as I am aware it has not been possible to apply a satisfactory coating of pure polyethylene to such a fabric because the bond is not sufficiently strong between the film and fabric.

The method of this invention can readily be used to impregnate such tightly woven fabrics, because the polyethylene is driven into the fabric to completely fill the interstices in the yarns and between the several yarns. After such a tightly woven fabric is impregnated by the method of this invention, the surface of the impregnated fabric retains substantially the configuration of the woven fabric with no lamination of polyethylene on the fabric, yet the fabric is completely filled with the polyethylene.

This invention provides a satisfactory method of calendering pure polyethylene into a web without the use of a lubricant or releasing agent. When this method is used to produce rubber coated tire fabric liners of the type described above, it provides a low cost method of applying polyethylene to such liners. A liner produced in accordance with this invention has a greatly enhanced ability to hold the tack of raw rubber compounds put up in such liners. The liner produced in accordance with this invention should have a longer life, and it will be easier to clean inasmuch as sulfur deposits from the raw rubber will be on the surface of the liner only. When used in its intended manner, a liner produced in accordance with this invention will provide a uniform stripping action of the raw rubber stock from the liner as the rolls are unwound. Furthermore when a liner is produced in accordance with this invention, it will not be so necessary to use materials and processes which are designed to increase raw rubber compound tackiness, as has been done in the past when plain fabric liners have been used.

Having thus described my invention, what I claim and desire to protect by Letters Patent is:

1. The method of impregnating a web with polyethylene, which comprises forming a softened film consisting essentially of polyethylene on a roll heated to a temperature above the melting point of said polyethylene, advancing said web through a nip formed by said roll and an adjacent surface, said nip having just sufficient clearance for said web and sufficient hot polyethylene to fill the interstices of said web, and applying a friction motion to said roll by rotating said roll at a greater speed than said surface and advancing said web through said nip to friction said polyethylene into said web.

2. The method of impregnating a web with polyethylene, which comprises forming a film consisting essentially of polyethylene on a roll heated to a temperature of at least 250° F., advancing said web through a nip formed by said heated roll and a second roll, said rolls being set as tightly as possible on said web without cutting it, and applying a friction motion to said rolls by rotating said heated roll at a greater speed than said second roll to friction said polyethylene into said web.

3. The method of impregnating a fabric with polyethylene, which comprises introducing polyethylene to a nip formed by a first heated roll having a surface temperature beneath the melting point of said polyethylene, and a second roll that is heated to at least 250° F., advancing the polyethylene about the heated second roll to a nip formed by said second roll and by a heated third roll heated to a temperature beneath the melting point of said polyethylene, advancing the fabric between said second and third rolls, said second and third rolls being set as tightly as possible on the fabric without cutting it, and applying a friction motion to said second and third rolls by rotating said second roll at a greater speed than said third roll to friction said polyethylene into said fabric.

4. The method of impregnating a fabric with polyethylene, which comprises providing a tightly woven fabric, introducing polyethylene to a first nip formed by a pair of rolls one of which is heated to a temperature of at least 250° F., advancing a film consisting essentially of polyethylene on said heated roll to a nip formed by said heated roll and a third roll, advancing said fabric through the nip formed by said heated roll and said third roll with the rolls being set as tightly as possible on the fabric without cutting it, and applying a friction motion to said rolls by rotating said heated roll at a greater speed than said third roll to friction said polyethylene into said fabric.

References Cited in the file of this patent

UNITED STATES PATENTS

| | | |
|---|---|---|
| 2,054,115 | Abrams et al. | Sept. 15, 1936 |
| 2,369,471 | Latham | Feb. 13, 1945 |
| 2,462,331 | Myers | Feb. 22, 1949 |
| 2,551,591 | Foord | May 8, 1951 |
| 2,598,090 | Yung et al. | May 27, 1952 |
| 2,625,499 | Nebesar | Jan. 13, 1953 |
| 2,714,571 | Irion et al. | Aug. 2, 1955 |